United States Patent
Maruyama (10) Patent No.: US 11,123,997 B2
(45) Date of Patent: Sep. 21, 2021

(54) LIQUID EJECTION DEVICE AND LIQUID EJECTION METHOD FOR SHAPING THREE-DIMENSIONAL SHAPED OBJECT, AND HAVING ULTRAVIOLET GENERATOR UNIFORMLY IRRADIATE ULTRAVIOLET LIGHT TO THE RANGE IN WHICH NOZZLE ROW OF INKJET HEADS EXISTS

(71) Applicant: MIMAKI ENGINEERING CO., LTD., Nagano (JP)

(72) Inventor: Kyohei Maruyama, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/413,618

(22) Filed: May 16, 2019

(65) Prior Publication Data
US 2019/0366736 A1 Dec. 5, 2019

(30) Foreign Application Priority Data
May 31, 2018 (JP) .............................. JP2018-104670

(51) Int. Cl.
*B41J 11/00* (2006.01)
*B41J 2/47* (2006.01)
(Continued)

(52) U.S. Cl.
CPC ............. *B41J 11/002* (2013.01); *B41J 2/435* (2013.01); *B41J 2/47* (2013.01); *B29C 64/112* (2017.08);
(Continued)

(58) Field of Classification Search
CPC ... B41J 2/47; B41J 11/002; B41J 2/435; B41J 2/44; B41J 2/447; B41J 2/45; B41J 2/475; B29C 64/112; B29C 64/264; B29C 64/277
See application file for complete search history.

(56) References Cited

U.S. PATENT DOCUMENTS

2014/0354743 A1* 12/2014 Tsuchiya ................ B41J 11/002
347/102
2015/0224793 A1* 8/2015 Tsuchiya ................ B41J 11/002
347/16
(Continued)

FOREIGN PATENT DOCUMENTS

JP 2015071282 4/2015

OTHER PUBLICATIONS

"Search Report of Europe Counterpart Application", dated Oct. 25, 2019, p. 1-p. 8.

*Primary Examiner* — Henok D Legesse
(74) *Attorney, Agent, or Firm* — JCIPRNET (57) ABSTRACT

A liquid ejection device that ejects an ultraviolet-curable liquid includes an inkjet head, which is an ejection head that ejects the ultraviolet-curable liquid; a scanning driver that causes the inkjet head to perform a main scan; an ultraviolet generator; and a light source driver; where the ultraviolet generator irradiates the ultraviolet while moving in the main scanning direction together with the inkjet head; the ultraviolet generator includes a plurality of UV LED elements; the plurality of UV LED elements are arranged such that a light emitting range overlaps a range of the nozzle row in a sub scanning direction; and the light source driver drives the plurality of UV LED elements such that an illuminance at an end portion in the sub scanning direction is larger than an illuminance at a central portion in the light emitting range.

8 Claims, 5 Drawing Sheets

(51) Int. Cl.
*B41J 2/435* (2006.01)
*B29C 64/112* (2017.01)
*B29C 64/277* (2017.01)
*B41J 2/447* (2006.01)
*B41J 2/45* (2006.01)
*B41J 2/44* (2006.01)
*B41J 2/475* (2006.01)

(52) U.S. Cl.
CPC ............... *B29C 64/277* (2017.08); *B41J 2/44* (2013.01); *B41J 2/447* (2013.01); *B41J 2/45* (2013.01); *B41J 2/475* (2013.01)

(56) References Cited

U.S. PATENT DOCUMENTS

2016/0214317 A1* 7/2016 Kobayashi ............ B29C 64/393
2017/0361532 A1* 12/2017 Yamazaki ............. B33Y 50/02

* cited by examiner

LIQUID EJECTION DEVICE AND LIQUID EJECTION METHOD FOR SHAPING THREE-DIMENSIONAL SHAPED OBJECT, AND HAVING ULTRAVIOLET GENERATOR UNIFORMLY IRRADIATE ULTRAVIOLET LIGHT TO THE RANGE IN WHICH NOZZLE ROW OF INKJET HEADS EXISTS

CROSS REFERENCE TO RELATED APPLICATIONS

This application claims the priority benefit of Japanese Patent Application No. 2018-104670, filed on May 31, 2018. The entirety of the above-mentioned patent application is hereby incorporated by reference herein and made a part of this specification.

TECHNICAL FIELD

The present disclosure relates to a liquid ejection device and a liquid ejection method.

DESCRIPTION OF THE BACKGROUND ART

Conventionally, a device that ejects liquid (ink) through an inkjet method is widely used. As such a device, for example, an inkjet printer that prints a two-dimensional image has become widespread. Furthermore, a shaping device (3D printer) and the like that shapes a shaped object through an inkjet method (see e.g., Patent Literature 1) is also conventionally known. In such devices, an ultraviolet-curable ink is widely used as a liquid to be ejected through the inkjet method.

Patent Literature 1: Japanese Unexamined Patent Publication No. 2015-071282

SUMMARY

When performing printing and shaping using an ultraviolet-curable ink, the ultraviolet is usually irradiated immediately after landing of the ink to cure the ink. More specifically, in this case, ink is ejected by causing an inkjet head including a nozzle row in which a plurality of nozzles are arranged to perform a main scan. An ultraviolet generator (ultraviolet light source) that generates the ultraviolet is moved with the inkjet head at the time of the main scan, so that the ultraviolet is irradiated to the ink immediately after landing. In this case, in the optical design (lamp design) of the ultraviolet generator, the design is desirably made to irradiate the ultraviolet with a respect to a range of the nozzle row with a uniform illuminance distribution. In this case, the illuminance distribution is a distribution of illuminance obtained by the entire ultraviolet generator. Furthermore, the illuminance distribution can be considered as, for example, a distribution corresponding to the distribution of light quantity of ultraviolet irradiated by the entire ultraviolet generator.

Moreover, with regards to this point, a desired illuminance distribution can be obtained if the optical design is performed by combining various lenses or the like. However, in this case, problems such as increase in size in the ultraviolet generator and increase in cost arise. On the other hand, the inventor of the present application considered using a configuration designed to arrange a plurality of UV LED elements (UV LED chips), which are LED elements that generate ultraviolet, on a plane as the ultraviolet generator. With such a configuration, a uniform illuminance distribution can be obtained relatively easily while, for example, preventing increase in size, increase in cost, and the like.

However, in this case as well, a desired illuminance distribution may not be obtained simply by arranging a plurality of UV LED elements. Thus, it is desirable to generate ultraviolet through a more appropriate method in a case where the ultraviolet generator is formed using a plurality of UV LED elements. The present disclosure thus provides a liquid ejection device and a liquid ejection method capable of overcoming such problem.

The inventor of the present application conducted intensive studies on a configuration using an ultraviolet generator in which a plurality of UV LED elements were arranged, and first found problems and the like in such a configuration. More specifically, in a case where the ultraviolet is irradiated using a configuration in which a plurality of UV LED elements are arranged, with regards to the illuminance as a whole of a configuration in which a plurality of UV LED elements are arranged, the illuminance of the ultraviolet at positions corresponding to both ends of the arrangement is assumed to be lower than the position corresponding to the central portion. On the other hand, in a case where the ultraviolet-curable ink is used in the conventional inkjet printer, with regards to a configuration for irradiating a uniform ultraviolet to the range of the nozzle row, a margin is set with respect to the nozzle length, which is the width of the nozzle row in the nozzle row direction, the ultraviolet generator is designed so as to irradiate the ultraviolet to a range larger than the range of the nozzle row by larger than or equal to a certain extent, and the like.

However, in this case, a new problem may arise by irradiating the ultraviolet even to a range that is not originally necessary. More specifically, in this case, the ultraviolet is irradiated to the ink ejected from the nozzle at the end of the nozzle row in a certain main scan even in other main scans. As a result, the difference in the cumulative light quantity of the irradiated ultraviolet becomes large between the ink ejected from the nozzle at the central portion of the nozzle row and the ink ejected from the nozzle at the end, and a difference may form in the state after curing. Furthermore, in this case, for example, the image quality to be printed may be affected, for example, in a configuration in which an image is printed through the inkjet printer. Moreover, the quality of a shaped object may be affected in a configuration in which the shaped object is shaped by a shaping apparatus. In addition, when shaping a shaped object through the inkjet method, for example, the shaped object is shaped by overlapping and forming a great number of layers of ink. In this case, it can be assumed that a larger influence may be caused as the influences occurring in the respective layers of ink are overlapped by the amount of layers of ink to be layered. On the contrary, the inventor of the present application considered reducing the irradiation of ultraviolet to a range that is not originally necessary by matching the range in which a plurality of UV LED elements are arranged to the nozzle length.

Here, in the case where an ultraviolet generator in which a plurality of UV LED elements are arranged is used, the influence as a point light source by the respective UV LED element becomes strong and a uniform illuminance distribution becomes difficult to obtain if the lamp gap, which is a distance between the irradiating target (workpiece) of the ultraviolet and the ultraviolet generator is small (low). Furthermore, as a result, color unevenness or the like may occur since the manner of curing of ink differs depending on the position. Thus, the lamp gap needs to be a distance of larger than or equal to a certain extent. On the contrary, however, when the lamp gap is large (high), it is conceivable that the decrease in illuminance of the ultraviolet (illuminance at the end of the ultraviolet generator) corresponding to the portion irradiated to the ink ejected from the nozzle at the end of the nozzle row becomes large in the illuminance distribution. In this case, uneven curing or the like may occur in the vicinity of the boundary of the region formed by each main scan performed at the time of printing or the time of shaping (e.g., in the vicinity of the boundary between passes), and the influence of banding may increase.

Therefore, the inventor of the present application considered driving a plurality of UV LED elements by not simply matching the range in which the plurality of UV LED elements are arranged to the nozzle length but so that the illuminance of the ultraviolet at the end portion of the ultraviolet generator becomes larger (higher) than the illuminance at the central portion. With this configuration, for example, the decrease in illuminance at the end of the ultraviolet generator can be appropriately suppressed. Furthermore, the inventor of the present application have found, through further intensive research, the features necessary for obtaining such effects and contrived the present disclosure.

In order to solve the above problems, the present disclosure provides a liquid ejection device that ejects an ultraviolet-curable liquid, which is a liquid that cures according to an ultraviolet, the liquid ejection device including an ejection head that ejects the ultraviolet-curable liquid from a nozzle row in which a plurality of nozzles are arranged, a scanning driver that causes the ejection head to perform a main scan of ejecting liquid while moving in a preset main scanning direction; an ultraviolet generator that generates the ultraviolet; and a light source driver that causes the ultraviolet generator to generate the ultraviolet; where when the ejection head performs the main scan, the ultraviolet generator irradiates the ultraviolet while moving in the main scanning direction together with the ejection head; the plurality of nozzles in the nozzle row are arranged so that positions in a sub scanning direction, which is a direction orthogonal to the main scanning direction, are different from each other; the ultraviolet generator includes a plurality of UV LED elements which are LED elements for generating the ultraviolet, the plurality of UV LED elements in the ultraviolet generator are arranged such that a light emitting range of the ultraviolet by the ultraviolet generator overlaps a range of the nozzle row in the sub scanning direction; and the light source driver drives the plurality of UV LED elements such that an illuminance of the ultraviolet at an end portion in the sub scanning direction is larger than an illuminance at a central portion in the light emitting range.

With this configuration, for example, the decrease in illuminance at the end of the ultraviolet generator can be appropriately suppressed, and the ultraviolet-curable liquid can be uniformly and appropriately cured. Thus, the ultraviolet can be generated through a more appropriate method, for example, in a case in which the ultraviolet generator including a plurality of UV LED elements is used as a configuration for curing the ultraviolet-curable liquid.

In this configuration, the light emitting range of the ultraviolet by the ultraviolet generator can be considered as, for example, a light emitting range or the like on an object on which the ultraviolet-curable liquid is ejected during the operation of the liquid ejection device. In this case, the object is, for example, a medium to be printed in an inkjet printer or a shaped object to be shaped in a shaping apparatus. Furthermore, in this configuration, the ultraviolet is irradiated to the irradiated range corresponding to the light emitting range of the ultraviolet by the ultraviolet generator in the object at the time of the operation of the liquid ejection device. For practical purposes, the width of the irradiating region in the sub scanning direction can be considered as substantially the same as the width of the light emitting range of the ultraviolet by the ultraviolet generator in the sub scanning direction. Therefore, a plurality of UV LED elements in the ultraviolet generator can be disposed such that, for example, the irradiated range overlaps the range of the nozzle row in the sub scanning direction. Furthermore, in this case, the operation of the light source driver, for example, can be thought as driving a plurality of UV LED elements as described above to uniformize the light quantity of the ultraviolet irradiated to the irradiated range overlapping the range of the nozzle row.

In this configuration, for example, an ultraviolet-curable ink or the like can be suitably used as the ultraviolet-curable liquid. Furthermore, for example, an inkjet head or the like can be suitably used as the ejection head. The movement of the ejection head during the main scan may be a relative movement with respect to a reference position set in advance. Further, the illuminance of the ultraviolet is, for example, the average illuminance while performing one main scan. In addition, in the sub scanning direction, the light emitting range of the ultraviolet by the ultraviolet generator is preferably substantially the same as the range of the nozzle row. When the light emitting range in the sub scanning direction is substantially the same as the range of the nozzle row, this means that, for example, an UV LED element which position in the sub scanning direction of the light emitting center is outside the range of the nozzle row in the sub scanning direction does not exist. Furthermore, in the nozzle row, the plurality of nozzles are lined, for example, in the direction of the nozzle row parallel to the sub scanning direction.

Further, in this configuration, the lamp gap is, for example, preferably 10 to 30 mm. The lamp gap is more preferably about 15 to 25 mm (e.g., about 20 mm). Furthermore, in this configuration, the light source driver drives the plurality of UV LED elements, for example, such that the illuminance of the ultraviolet at the end portion in the sub scanning direction becomes 1.5 to 2 times the illuminance at the central portion. In this case, the illuminance of the ultraviolet at the end portion in the sub scanning direction is, for example, the illuminance of the ultraviolet irradiated by the UV LED element disposed at the end portion. Furthermore, the illuminance at the central portion is, for example, the illuminance of the ultraviolet irradiated by the UV LED element disposed at the central portion. In addition, the illuminance of one part (end portion, central portion, etc.) among the plurality of UV LED elements is, for example, illuminance of the ultraviolet irradiated to a position facing such one part. Furthermore, the ultraviolet irradiated to a position facing the UV LED element of one part means, for example, the illuminance of the ultraviolet irradiated to a portion facing the UV LED element of one part in a plane when the plane is placed at a position separated by a preset lamp gap. With this configuration, for example, the decrease in illuminance at the end of the ultraviolet generator can be appropriately suppressed. The illuminance of the ultraviolet at the end portion in the sub scanning direction is more preferably about 1.6 to 1.8 times the illuminance at the central portion.

Furthermore, in this configuration, the liquid ejection device is, for example, a shaping apparatus that shapes a three-dimensional shaped object. In this case, the ejection head ejects an ultraviolet-curable liquid used for shaping the shaped object. With such a configuration, for example, a high-quality shaped object can be appropriately shaped. Furthermore, in this configuration, for example, the scanning driver further causes the ejection head to perform a sub scan of relatively moving in the sub scanning direction with respect to the shaped object being shaped. Thus, the liquid ejection device thereby forms a plurality of layers formed of ultraviolet-curable liquid in an overlapping manner, and shapes a shaped object. Moreover, in this case, for example, it is conceivable to form each layer by a multi-pass method of performing a plurality of main scans with respect to the same position.

In this case, it is conceivable to perform the operation in the small pitch method as a specific operation of the multi-pass method. In this case, the operation in the small pitch method is, for example, an operation of performing a main scan for the pass number with the sub scan in between in a state in which the feed amount, which is the movement amount, in the sub scan at the time of the sub scan is set small, and performing a sub scan with a larger feed amount every time the main scan for the pass number is performed. In this case, in the small-pitch sub scan performed between main scans for the pass number, it is conceivable to have the feed amount (feed amount of small pitch) to an integral multiple of the nozzle interval (nozzle pitch) in the nozzle row. In this case, the feed amount of the small pitch is preferably greater than or equal to the nozzle pitch (one time of nozzle pitch). More specifically, it is conceivable to have the feed amount of the small pitch, for example, to about 1 to 20 times the nozzle pitch, preferably about 1 to 5 times the nozzle pitch. Furthermore, the feed amount of the small pitch is preferably sufficiently smaller than the length of the nozzle row. Therefore, it is conceivable to have the feed amount of the small pitch to, for example, smaller than or equal to about $1/30$ of the length of the nozzle row in the sub scanning direction. Further, the feed amount of the small pitch may be less than or equal to about $1/50$ of the length of the nozzle row in the sub scanning direction. Furthermore, in this case, it is conceivable to set the feed amount in the sub scan with a large feed amount to, for example, a distance matching the nozzle length. In addition, in this case, the operation in the small pitch method, for example, can be considered as an operation of setting the feed amount to the small pitch, as described above, in the sub scan performed between at least some of the main scans among the plurality of main scans performed while forming one layer. In a case of performing the operation of the small pitch method, since the plurality of main scans are performed without barely changing the position in the sub scanning direction, the influence of the manner of irradiating the ultraviolet to the vicinity of the end of the ultraviolet generator may easily occur. On the other hand, in the case of the configuration as described above, uniform ultraviolet can be irradiated to the range corresponding to the nozzle row while suppressing the light quantity of the ultraviolet irradiated to the outside of the nozzle row range. Therefore, the occurrence of problems due to such influence can also be appropriately prevented in a case of performing the operation of the small pitch method.

Furthermore, in this configuration, for example, assuming a position in the sub scanning direction of the nozzle on one-end side of the nozzle row as a one-end side nozzle position, the position in the sub scanning direction of the nozzle on the other-end side of the nozzle row as an other-end side nozzle position, an UV LED element at an extreme end on one side in the sub scanning direction of the plurality of UV LED elements in the ultraviolet generator as a one-side LED, and an UV LED element at an extreme end on the other end in the sub scanning direction as an other-side LED, the preferred arrangement of the plurality of UV LED elements can be considered by such positional relationship. More specifically, in this case, for example, consideration is made to setting the one-end side nozzle position to a position same as the position in the sub scanning direction of any portion of the one-side LED, and setting the other-end side nozzle position to a position same as the position in the sub scanning direction of any portion of the other-side LED. In this case, any portion of the UV LED element such as the one-side LED or the other-side LED refers to, for example, any portion of the light emitting region of the UV LED element. With such a configuration, for example, a plurality of UV LED elements can be appropriately disposed at positions matching the nozzle length. More specifically, in this case, the position of the light emitting center of the one side LED in the sub scanning direction is aligned with the one-end side nozzle position and the position of the light emitting center of the other side LED in the sub scanning direction is aligned with the other-end side nozzle position. With such a configuration, for example, a plurality of UV LED elements can be more appropriately disposed at positions matching the nozzle length.

In addition, in this configuration, it is conceivable to adjust the illuminance at each position of the ultraviolet generator by, for example, controlling the illuminance of each UV LED element. In this case, for example, it is conceivable to control the illuminance of each UV LED element so that the illuminance of the UV LED element disposed at the end portion in the sub scanning direction becomes larger than the illuminance of the UV LED element disposed at the central portion in the sub scanning direction. Furthermore, in this case, the illuminance of the UV LED element refers to, for example, the illuminance of ultraviolet irradiated to a position facing the relevant UV LED element. Furthermore, the ultraviolet irradiated to the position facing the UV LED element is, for example, the illuminance of the ultraviolet irradiated by the UV LED element to a portion facing the UV LED element in a plane when the plane is placed at a position separated by a preset lamp gap.

Furthermore, in this case, the illuminance of the UV LED element does not necessarily need to be controlled in a single unit, and the illuminance of the UV LED element may be controlled for every unit in which the plurality of UV LED elements are collected. More specifically, in the ultraviolet generator, it is conceivable to arrange the plurality of UV LED elements in an array form, for example, in a column direction parallel to the sub scanning direction and a row direction parallel to the main scanning direction. In this case, for example, defining a plurality of UV LED elements lined in the row direction with the positions in the column direction aligned as a row of UV LED elements, it is conceivable to control the illuminance of the UV LED elements in row units Moreover, in this case, for example, consideration is made to drive the plurality of UV LED elements by the light source driver such that the illuminance of the UV LED element included in the row at the end in the column direction becomes larger than the illuminance of the UV LED element included in the row at the central portion in the column direction. With this configuration, for example, the illuminance at each position of the ultraviolet generator can be appropriately adjusted. In this case, the density of the UV LED elements can be assumed to be uniform. In this case, for example, the illuminance of each UV LED element is controlled by adjusting the current supplied to each UV LED element.

Depending on the configuration of the ultraviolet generator, for example, the illuminance may be changed depending on the position in the sub scanning direction by differing the density of the UV LED element depending on the position. More specifically, for example, when the number of UV LED elements per unit length in the sub scanning direction is defined as LED density, it is conceivable to arrange the plurality of UV LED elements such that the LED density at the end portion in the sub scanning direction becomes larger than the density at the central portion in the ultraviolet generator. In such a configuration as well, the illuminance at each position of the ultraviolet generator can be appropriately adjusted. Furthermore, in this case, it is conceivable that the current supplied to each UV LED element is not made different for each element but is set to a preset constant current.

Consideration is made to using a liquid ejection method having the features similar to the above and the like for the configuration of the present disclosure. In this case as well, for example, effects similar to the above can be obtained.

According to the present disclosure, the ultraviolet can be generated through a more appropriate method, for example, in a case in which the ultraviolet generator including a plurality of UV LED elements is used as a configuration for curing the ultraviolet-curable liquid.

BRIEF DESCRIPTION OF THE DRAWINGS

FIGS. 1A and 1B are views showing one example of a shaping apparatus 10 according to one embodiment of the present disclosure.

FIGS. 2A and 2B are views showing one example of a specific configuration of an ultraviolet generator 104.

FIGS. 4A and 4B are views explaining the manner of driving a plurality of UV LED elements 402 in further detail.

FIGS. 5A and 5B are views explaining an operation of a multi-pass method at the time of forming a layer of ink.

DESCRIPTION OF EMBODIMENTS

Figure 1A:
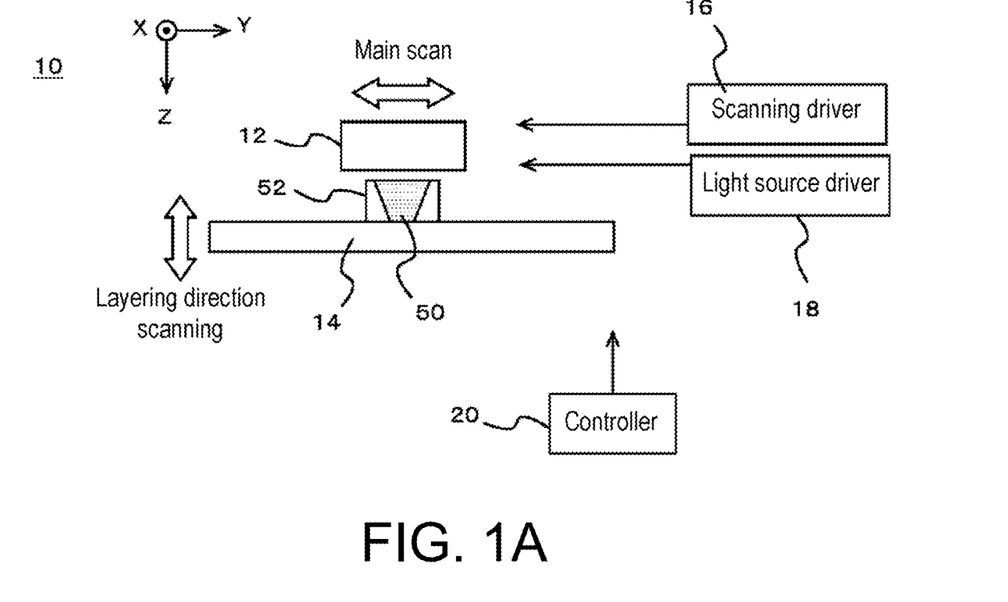
FIG. 1A shows one example of a configuration of a main part of the shaping apparatus 10.
Figure 1B:
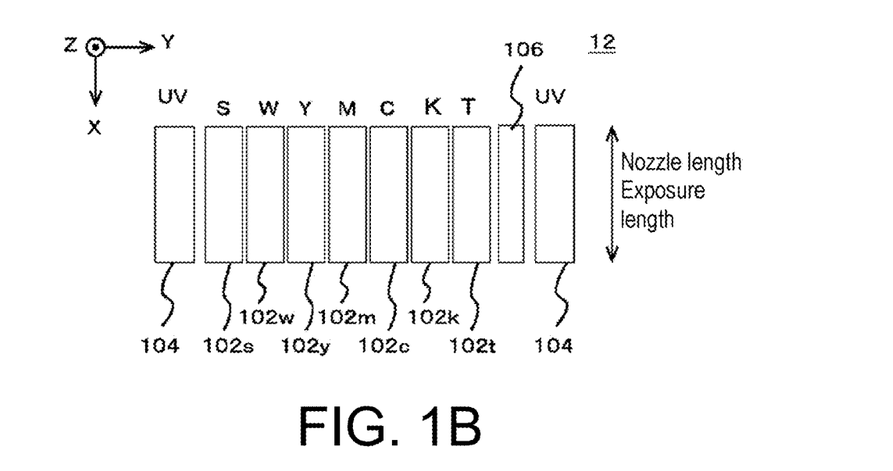
FIG. 1B shows an example of a configuration of a head portion 12 in the shaping apparatus 10.

Hereinafter, an embodiment according to the present disclosure will be described with reference to the drawings. FIGS. 1A and 1B show one example of a shaping apparatus 10 according to one embodiment of the present disclosure. FIG. 1A shows one example of a configuration of a main part of the shaping apparatus 10. FIG. 1B shows an example of a configuration of a head portion 12 in the shaping apparatus 10.

Other than the points described below, the shaping apparatus 10 may have features same as or similar to a known shaping apparatus. More specifically, other than the points described below, the shaping apparatus 10 may have a feature same as or similar to a known shaping apparatus that carries out shaping by ejecting a droplet which is to become the material of a shaped object 50 using an inkjet head. Furthermore, other than the illustrated configuration, the shaping apparatus 10 may also include, for example, various types of configurations necessary for shaping, and the like of the shaped object 50. Furthermore, in the present example, the shaping apparatus 10 is one example of a liquid ejection device. In this case, at least a part of the operation of the shaping apparatus 10 can also be considered, for example, as an operation related to a liquid ejection method, and the like. Moreover, in the present example, the shaping apparatus 10 is a shaping apparatus (3D printer) that shapes a three-dimensional shaped object 50 by a layered shaping method. In this case, the layered shaping method is, for example, a method of shaping the shaped object 50 by overlapping a plurality of layers. The shaped object 50 means, for example, a stereoscopic three-dimensional structural object.

Furthermore, in the present example, the shaping apparatus 10 includes a head portion 12, a shaping table 14, a scanning driver 16, a light source driver 18, and a controller 20. The head portion 12 is a portion that ejects the material of the shaped object 50. Furthermore, in the present example, ink is used as the material of the shaped object 50. In this case, the ink is, for example, a functional liquid. Furthermore, in this example, the ink can also be considered as, for example, a liquid to be ejected from an inkjet head. In this case, the inkjet head is, for example, an ejection head that ejects ink droplet through an inkjet method. More specifically, the head portion 12 ejects ink that cures according to predetermined conditions from a plurality of inkjet heads as a material of the shaped object 50. Then, each layer forming the shaped object 50 is formed in an overlapping manner by curing the ink after landing. Moreover, in the present example, an ultraviolet-curable ink (UV ink) that cures from a liquid state by irradiating ultraviolet is used as the ink. The ultraviolet-curable ink is an example of an ultraviolet-curable liquid which is a liquid that cures according to the ultraviolet.

Furthermore, the head portion 12 further ejects a material of a support layer 52 in addition to the material of the shaped object 50. The head portion 12 thereby forms the support layer 52 at a periphery of the shaped object 50, as necessary. The support layer 52 is, for example, a layered structural object that supports the shaped object 50 by surrounding the outer periphery of the shaped object 50 being shaped. The support layer 52 is formed as necessary at the time of shaping of the shaped object 50 and removed after the completion of the shaping. In the present example, the head portion 12 includes a plurality of inkjet heads, a plurality of ultraviolet generators, and a flattening roller. A specific configuration of the head portion 12 will be described in detail later.

The shaping table 14 is a table-shaped member that supports the shaped object 50 being shaped, and is disposed at a position facing the inkjet head in the head portion 12, and has the shaped object 50 being shaped placed on the upper surface thereof. Furthermore, in the present example, the shaping table 14 has a configuration in which at least the upper surface is movable in a layering direction (Z direction in the figure), and moves at least the upper surface in accordance with the progress of the shaping of the shaped object 50 by being driven by the scanning driver 16. In this case, the layering direction means, for example, a direction in which the material of shaping is layered in the layered shaping method. More specifically, in the present embodiment, the layering direction is a direction orthogonal to a main scanning direction (Y direction in the drawing) and a sub scanning direction (X direction in the drawing) set in advance in the shaping apparatus 10.

The scanning driver 16 is a driver that causes the head portion 12 to perform a scanning operation of relatively moving with respect to the shaped object 50 being shaped. In this case, "relatively moving with respect to the shaped object 50 being shaped" means, for example, relatively moving with respect to the shaping table 14. Causing the head portion 12 to perform the scanning operation means, for example, causing the inkjet head of the head portion 12 to perform the scanning operation. Furthermore, in the present example, the scanning driver 16 causes the head portion 12 to perform a main scan (Y scanning), a sub scan (X scanning), and a layering direction scanning (Z scanning).

The main scan is, for example, an operation of ejecting ink while relatively moving in the main scanning direction with respect to the shaped object 50 being shaped. In the present example, the scanning driver 16 causes the head portion 12 to perform the main scan by fixing the position of the shaping table 14 in the main scanning direction and moving the head portion 12 side. Furthermore, for example, the scanning driver 16 may move the shaped object 50 side by fixing the position of the head portion 12 in the main scanning direction and moving, for example, the shaping table 14.

The sub scan means, for example, an operation of relatively moving with respect to the shaped object 50 being shaped in the sub scanning direction orthogonal to the main scanning direction. More specifically, the sub scan is, for example, an operation of relatively moving with respect to the shaping table 14 in the sub scanning direction by a feed amount set in advance. In the present example, the scanning driver 16 causes the head portion 12 to perform the sub scan by fixing the position of the head portion 12 in the sub scanning direction and moving the shaping table 14 between the main scans. Furthermore, the scanning driver 16 may cause the head portion 12 to perform the sub scan by fixing the position of the shaping table 14 in the sub scanning direction and moving the head portion 12.

The layering direction scanning is, for example, an operation of moving the head portion 12 in the layering direction relatively with respect to the shaped object 50 being shaped. Furthermore, the scanning driver 16 adjusts the relative position of the inkjet head with respect to the shaped object 50 being shaped in the layering direction by causing the head portion 12 to perform the layering direction scanning in accordance with the progress of the shaping operation. More specifically, in the layering direction scanning of the present example, the scanning driver 16 fixes the position of the head portion 12 in the layering direction and moves the shaping table 14. The scanning driver 16 may fix the position of the shaping table 14 in the layering direction and move the head portion 12.

The light source driver 18 is a driver that causes the ultraviolet generator in the head portion 12 to generate ultraviolet. The operation of the light source driver 18 will be described in more detail later. The controller 20 is, for example, a CPU of the shaping apparatus 10, and controls the shaping operation in the shaping apparatus 10 by controlling each portion of the shaping apparatus 10. More specifically, the controller 20 controls each portion of the shaping apparatus 10 based on, for example, shape information, color information and the like of the shaped object 50 to be shaped.

According to the present example, each layer forming the shaped object 50 can be appropriately formed with the ultraviolet-curable ink by for example, causing the head portion 12 to perform the main scan and the sub scan. Furthermore, a plurality of layers can be appropriately layered by appropriately performing the layering direction scanning. Moreover, for example, the shaped object 50 thus can be appropriately shaped through the layered shaping method.

Next, a specific configuration of the head portion 12 will be described. In the present example, the head portion 12 includes a plurality of inkjet heads, a plurality of ultraviolet generators 104, and a flattening roller 106. As shown in FIG. 1B, the plurality of inkjet heads include an inkjet head 102s, an inkjet head 102w, an inkjet head 102y, an inkjet head 102m, an inkjet head 102c, an inkjet head 102k, and an inkjet head 102t (hereinafter referred to as inkjet heads 102s to t). The plurality of inkjet heads are, for example, one example of an ejection head, and are disposed side by side in the main scanning direction with their positions in the sub scanning direction aligned. Furthermore, each inkjet head includes a nozzle row, in which a plurality of nozzles are disposed in a predetermined nozzle row direction, on a surface facing the shaping table 14. Furthermore, in the present example, the nozzle row direction is a direction parallel to the sub scanning direction. In this case, the plurality of nozzles forming the nozzle row can be assumed as being disposed such that the positions in the sub scanning direction are different from each other.

Among the inkjet heads, the inkjet head 102s is an inkjet head that ejects the material of the support layer 52. For example, a known material for the support layer can be suitably used for the material of the support layer 52. The inkjet head 102w is an inkjet head that ejects ink of white color (W color) ink. In this case, the white ink is used, for example, in a case of forming a region (light reflecting region) having a property of reflecting light in the shaped object 50.

The inkjet head 102y, the inkjet head 102m, the inkjet head 102c, and the inkjet head 102k are inkjet heads for coloring used at the time of shaping the colored shaped object 50. The inkjet head 102y ejects ink of yellow color (Y color). The inkjet head 102m ejects ink of magenta color (M color). The inkjet head 102c ejects ink of cyan color (C color). Furthermore, the inkjet head 102k ejects ink of black color (K color). In addition, in this case, each color of YMCK is an example of process colors used for full color representation by a subtractive color mixing method. The inkjet head 102t is an inkjet head that ejects a clear ink. The clear ink is, for example, ink of clear color, which is a colorless transparent color (T).

For example, the colored shaped object can be appropriately shaped by using the ink of each color as described above. Furthermore, in a case of shaping a colored shaped object, more specifically, for example, it is conceivable to form a colored region in a portion where hue can be visually recognized from the outside and form a light reflecting region on the inner side of the colored region. In this case, the colored region is formed using, for example, ink of each color of YMCK and clear ink. The light reflecting region is formed using, for example, white ink. Furthermore, it is conceivable to form the region (inner region) on the inner side of the light reflecting region using any ink other than the material of the support layer 52. Moreover, in a modified example of the configuration of the head portion 12, the head portion 12 may further include inkjet heads for colors other than those described above. In addition, a plurality of inkjet heads may be provided for inks that are used in large amounts. In this case, for example, it is conceivable to provide the inkjet head 102s for the material of the support layer 52 in plurals (e.g., two).

The plurality of ultraviolet generators 104 are light source portions (lamp portions) that generate the ultraviolet for curing the ultraviolet-curable ink. Moreover, in the present example, each of the plurality of ultraviolet generators 104 are disposed on one-end side and the other-end side in the main scanning direction in the head portion 12 so as to sandwich the inkjet heads 102s to 102t in between. In addition, in the head portion 12 of the present example, the plurality of ultraviolet generators 104 are disposed in a state in which the relative position with respect to the inkjet heads 102s to 102t is fixed by being held by, for example, a carriage (not shown). In this case, at the time of the main scan, the plurality of ultraviolet generators 104 irradiate the ultraviolet while moving in the main scanning direction together with the inkjet heads 102s to 102t. Thus, for example, with respect to the ink landed on the surface to be shaped of the shaped object 50 being shaped, ultraviolet is irradiated by the ultraviolet generator 104 which is located behind the inkjet heads 102s to 102t in the moving direction at the time of the main scan. With this configuration, for example, the ultraviolet for curing the ink can be appropriately irradiated at the time of each main scan. Furthermore, in the present example, each of the ultraviolet generators 104 includes a plurality of UV LED elements, which are LED elements for generating the ultraviolet. Therefore, the ultraviolet generator 104 of the present example can be considered as, for example, a UV LED lamp or the like. Furthermore, the specific configuration of the ultraviolet generator 104 will be described in more detail later.

The flattening roller 106 is a flattening device for flattening the layer of the ink formed during the shaping of the shaped object 50. Furthermore, for example, the flattening roller 106 flattens the layer of ink by coming into contact with a surface of the layer of ink and removing one part of the ink before curing at the time of the main scan. The layer of ink forming the shaped object 50 can be appropriately formed by using the head portion 12 having the above configuration. Furthermore, the shaped object 50 can be appropriately shaped by forming the plurality of layers of inks in an overlapping manner.

Figure 2A:
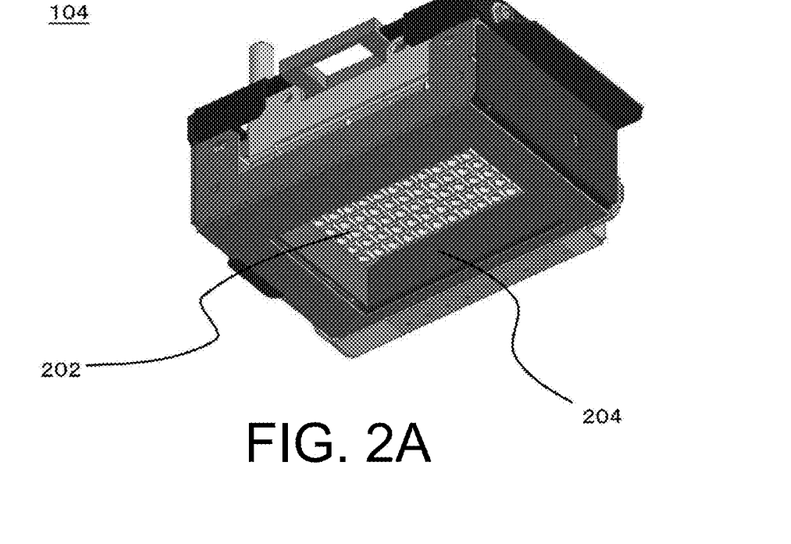
FIG. 2A is a perspective view showing one example of a detailed configuration of the ultraviolet generator 104.

Now, a specific configuration of the ultraviolet generator 104 will be described in more detail. FIGS. 2A and 2B show one example of a specific configuration of the ultraviolet generator 104. FIG. 2A is a perspective view showing one example of a detailed configuration of the ultraviolet generator 104.

In the present example, the ultraviolet generator 104 includes an LED array 202 and a mirror 204. The LED array 202 is a portion that generates ultraviolet in the ultraviolet generator 104, and is configured by a plurality of UV LED elements arranged in an array form. The arrangement of the plurality of UV LED elements in the LED array 202 will be described in more detail later. A mirror 204 is a light reflecting portion that reflects the ultraviolet, and reflects the ultraviolet generated by the LED array 202 by surrounding the periphery of the LED array 202 as shown in the figure. With this configuration, for example, the ultraviolet directed toward the areas other than the front side of the LED array 202 is appropriately shielded, and the directivity of the ultraviolet generator 104 can be appropriately enhanced.

Furthermore, in the ultraviolet generator 104 of the present example, the lamp gap in design is 20 mm. In this case, the lamp gap is, for example, the distance between the light source that generates the ultraviolet and the ultraviolet irradiation target (workpiece). Furthermore, the lamp gap can be considered as, for example, a distance in the layering direction between the surface to be shaped in the shaped object 50 and the LED array 202 in the ultraviolet generator 104. In this case, the distance in the layering direction between the surface to be shaped and the LED array 202 is, for example, the distance in the layering direction between the surface of the light emitting region of the UV LED element forming the LED array 202 and the surface to be shaped. The lamp gap may be a distance other than 20 mm. In this case, the lamp gap is preferably, for example, 10 to 30 mm. The lamp gap is more preferably about 15 to 25 mm.

Figure 2B:
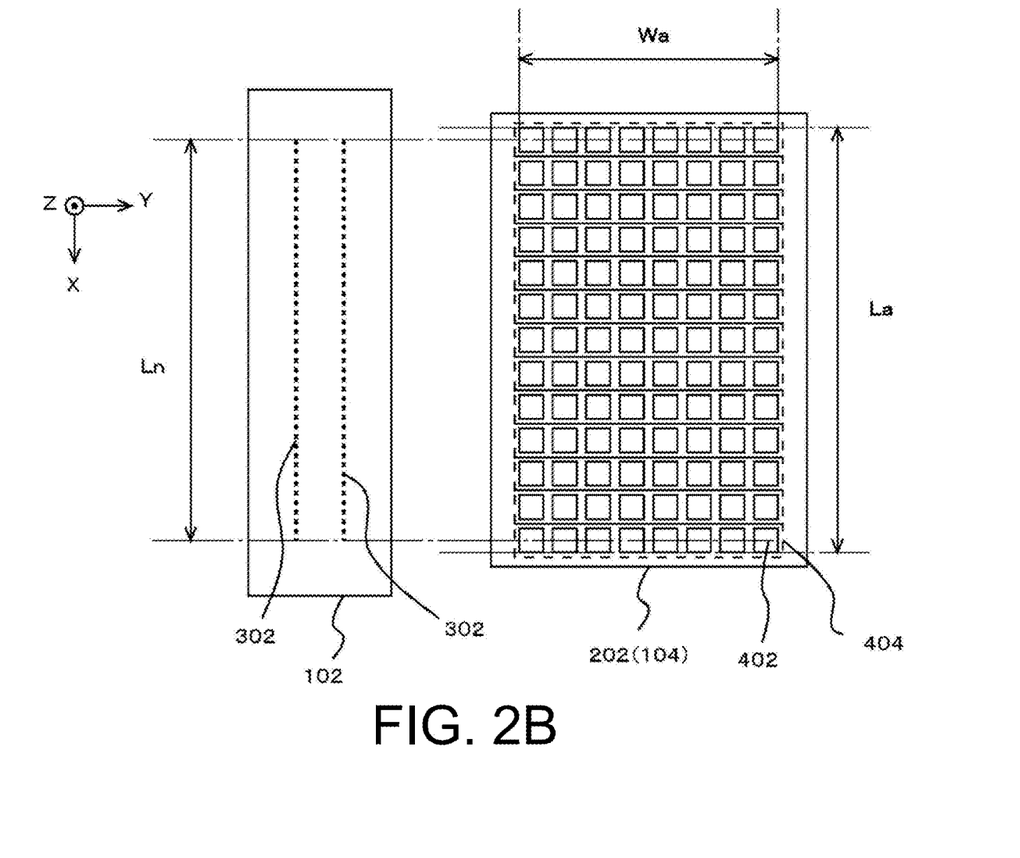
FIG. 2B is a view showing one example of an arrangement of a plurality of UV LED elements in an LED array 202.

Now, the arrangement of the plurality of UV LED elements in the LED array 202 will be described in more detail. FIG. 2B is a view showing an example of an arrangement of a plurality of UV LED elements in the LED array 202, and shows an example of a configuration of the LED array 202 together with the inkjet head 102. In this case, the inkjet head 102 shown in the figure is an inkjet head corresponding to any one of the inkjet heads 102s to 102t (see FIGS. 1A and 1B) in the head portion 12. Furthermore, in FIG. 2B, for the sake of convenience of illustration, the inkjet head 102 and the LED array 202 are shown for the purpose of mainly showing the positional relationship between the inkjet head 102 and the LED array 202 in the sub scanning direction. Therefore, the positions of the inkjet head 102 and the LED array 202 in the main scanning direction do not necessarily reflect the actual positions.

As described above, in the present example, the inkjet head 102 includes a nozzle row 302 in which a plurality of nozzles are arranged in the sub scanning direction. In the illustrated configuration, the inkjet head 102 includes a plurality of nozzle rows 302 lined in the main scanning direction. The plurality of nozzle rows 302 are columns having the same nozzle length (nozzle row length) Ln, and are formed at positions shifted in position in the main scanning direction so that the nozzles are aligned in a predetermined range in the sub scanning direction. Furthermore, the nozzle length Ln, for example, can be considered as the length of the nozzle row in the sub scanning direction, the width of the range of the nozzle row, and the like.

Furthermore, as described above, the LED array 202 is configured by a plurality of UV LED elements 402 arranged in an array form. In this case, the UV LED element 402 is, for example, a semiconductor element that generates an ultraviolet. Furthermore, for example, the UV LED elements 402 are mounted so as to be arranged in an array form, thus forming the LED array 202. Moreover, in the LED array 202, the respective UV LED elements 402 may be individually packaged. More specifically, in the present example, the plurality of UV LED elements 402 forming the LED array 202 are arranged in an array form in a column direction parallel to the sub scanning direction and a row direction parallel to the main scanning direction. In the LED array 202, the plurality of UV LED elements 402 are arranged so that the light emitting range of the ultraviolet by the LED array 202 overlaps the range of the nozzle row 302 in the sub scanning direction, so that a light emitting length (exposure length) La which is the length in the sub scanning direction of a range in which the ultraviolet is emitted in the LED array 202 is equal to the nozzle length Ln of the inkjet head 102.

Such a configuration, for example, can be considered as a configuration of having the light emitting range of the ultraviolet by the ultraviolet generator 104 substantially the same as the range of the nozzle row in the sub scanning direction, or the like. In this case, when the light emitting range in the sub scanning direction is substantially the same as the range of nozzle row, this means that, for example, the range in which the plurality of UV LED elements 402 are arranged in the LED array 202 is substantially the same as the range of the nozzle row. Furthermore, in this case, when the range in the sub scanning direction is substantially the same, this means that, for example, as shown in the figure, an amount of misalignment between the position of the end in the sub scanning direction in the range where the plurality of UV LED elements 402 are arranged and the position of the end of the nozzle row 302 is smaller than the width of one UV LED element 402. Therefore, the fact that the light emitting length La is equal to the nozzle length Ln is not necessarily limited to the case where the light emitting length La is equal to the nozzle length Ln, and as shown in the figure, also includes a case where the light emitting length La is larger than the nozzle length Ln by a distance less than the width of one UV LED element 402. Furthermore, in this case, the amount of misalignment (amount of misalignment at one end) at the end portion of the range of the nozzle length Ln and the range of the light emitting length La is preferably less than half of the width of one UV LED element 402. Moreover, the nozzle length Ln, for example, can be assumed to be about 50 to 60 mm. Furthermore, it is conceivable to have the light emitting length La to, for example, to be larger than the nozzle length Ln and about 55 to 65 mm. Moreover, it is conceivable to have the width Wa of the light emitting range of the LED array 202 in the main scanning direction to, for example, about 30 to 40 mm.

Assuming the position in the sub scanning direction of the nozzle on one-end side of the nozzle row 302 in the inkjet head 102 as a one-end side nozzle position, the position in the sub scanning direction of the nozzle on the other-end side of the nozzle row 302 is an other-end side nozzle position, the UV LED element at the extreme end on one side in the sub scanning direction of the plurality of UV LED elements 402 in the LED array 202 as a one-side LED, and the UV LED element at the extreme end on the other end in the sub scanning direction as an other-side LED, the arrangement of the plurality of UV LED elements 402 in the LED array 202 can be considered to be such that, for example, the one-end side nozzle position is the same position as the position in the sub scanning direction of any portion of the one-side LED and the other-end side nozzle position is the same position as the position in the sub scanning direction of any portion of the other-side LED. In this case, any portion of the UV LED element 402 such as the one-side LED or the other-side LED means, for example, any portion of the light emitting region of the UV LED element 402. In this case, the plurality of UV LED elements 402 in the LED array 202 are all UV LED elements 402 in the LED array 202. Furthermore, all the UV LED elements 402 are, for example, all UV LED elements 402 that substantially irradiate the ultraviolet for curing ink.

In this case, it is conceivable to set the position in the sub scanning direction of the light emitting center of the one-side LED and the other-side LED so as to match the range of the nozzle row. More specifically, in this case, for example, the position of the light emitting center of the one-side LED in the sub scanning direction is aligned with the one-end side nozzle position and the position of the light emitting center of the other-side LED in the sub scanning direction is aligned with the other-end side nozzle position. With such a configuration, for example, a plurality of UV LED elements 402 can be appropriately disposed at positions matching the nozzle length Ln.

The positions of the light emitting centers of the one-side LED and the other-side LED are not necessarily strictly adjusted to the range of the nozzle row, and may be set such that the amount of misalignment of the positions is within a tolerable range set in advance. In addition, the UV LED element 402 usually generates the ultraviolet not only from the light emitting center but also from the light emitting region including the periphery of the light emitting center. Therefore, when the position of the light emitting center of the one-side LED or the other-side LED is shifted from the position of the end of the range of the nozzle row (one-end side nozzle position or the other-end side nozzle position), the positions are preferably shifted such that the light emitting center is located within the range of the nozzle row. Furthermore, such a configuration can also be considered as, for example, a configuration in which the UV LED element 402, which light emitting length La is larger than the nozzle length Ln and which position in the sub scanning direction at the center of light emission is outside the range of the nozzle row in the sub scanning direction, does not exist.

As described above, in the LED array 202 of the present example, the plurality of UV LED elements 402 are arranged in an array form in the column direction parallel to the sub scanning direction and the row direction parallel to the main scanning direction. In this case, as partitioned by a line in the figure, a plurality of UV LED elements 402 forming the LED array 202 can be divided into a plurality of rows 404.

In this case, the row 404 is a plurality of UV LED elements 402 arranged in the row direction with positions in the column direction aligned. Furthermore, the row 404 can be considered as, for example, a block of a plurality of UV LED elements 402 arranged in the row direction, and the like. Moreover, as will be described in more detail later, in the present example, the light source driver 18 (see FIGS. 1A and 1B) controls the illuminance of each UV LED element 402 with a row 404 as a unit. Therefore, for the row 404, for example, it can be considered as a controller of illuminance of the ultraviolets, and the like. More specifically, in the case of the configuration shown in the figure, each row 404 is configured by eight UV LED elements 402. Furthermore, the LED array 202 is configured by 13 rows 404 arranged in the column direction.

Figure 3:
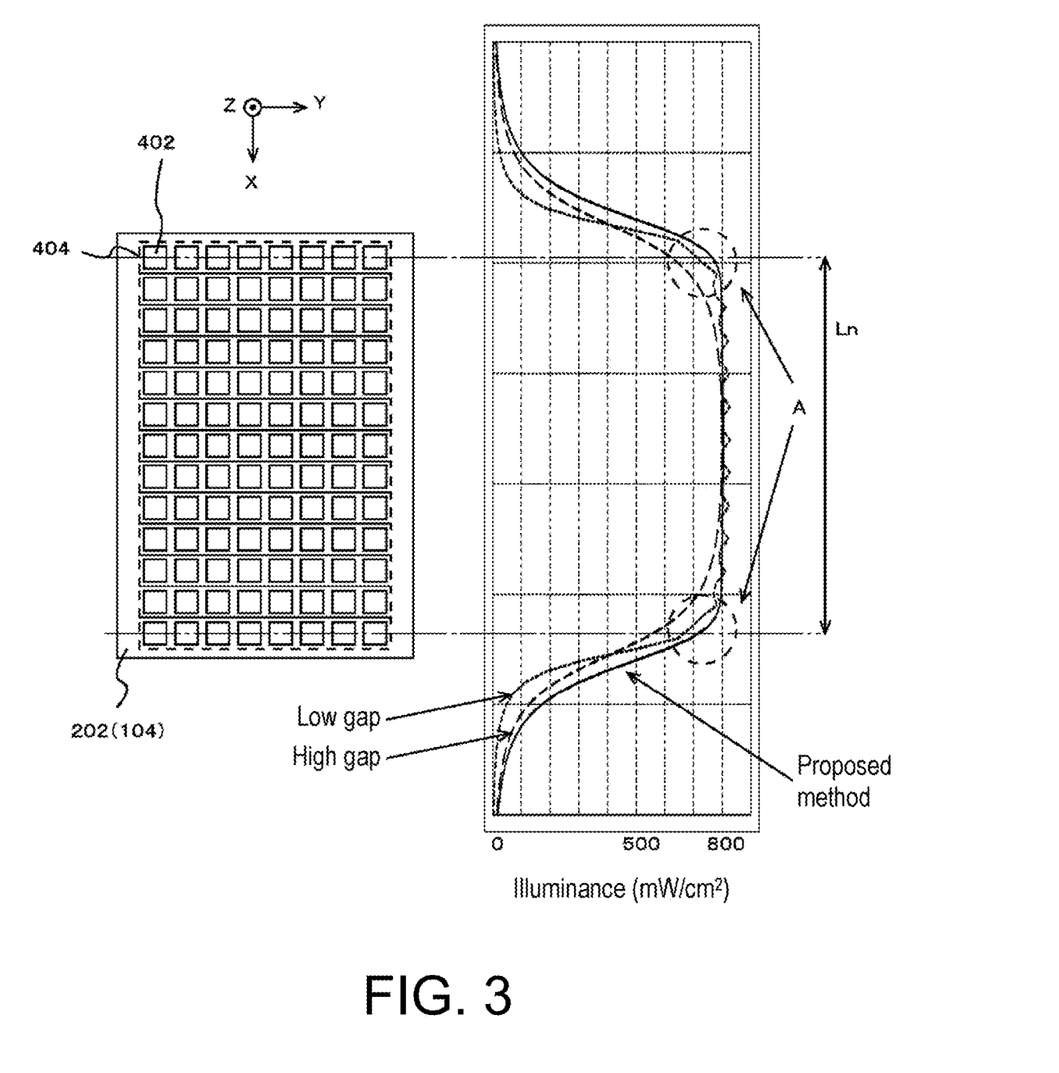
FIG. 3 is a view explaining the illuminance distribution of the ultraviolet irradiated by the ultraviolet generator 104.

Next, the operation of the light source driver 18 that drives each UV LED element 402 in the LED array 202 will be described in more detail. FIG. 3 is a view explaining the illuminance distribution of the ultraviolet irradiated by the ultraviolet generator 104. In this case, the illuminance distribution of the ultraviolet irradiated by the ultraviolet generator 104 is the distribution of the illuminance of the ultraviolet irradiated to the irradiated position by the ultraviolet generator 104 including the LED array 202 having the configuration described with reference to FIGS. 2A and 2B. In addition, the illuminance of the ultraviolet irradiated to the irradiated position is, for example, the illuminance of the ultraviolet irradiated to each position (each position in the sub scanning direction) in the plane at a position facing the ultraviolet generator 104 with a set lamp gap.

Also, in the figure, the graph on the right side is the measurement result of the illuminance distribution of an ultraviolet obtained by experiments conducted under three types of conditions; low gap, high gap, and proposed technique in the figure. Furthermore, in FIG. 3, the LED array 202 is illustrated on the left side of the graph in order to associate each position in the sub scanning direction in the graph with each position in the LED array 202. Moreover, in the LED array 202 used in this experiment, the light emitting length La is 57.5 mm. The width Wa of the light emitting range in the main scanning direction is 35 mm. Furthermore, the LED array 202 is an example of an LED array 202 used when the nozzle length Ln is about 57.5 mm.

Among the above three types of conditions, the condition of low gap is a condition in which the lamp gap is reduced. The condition of high gap is a condition in which the lamp gap is increased by larger than or equal to a certain extent. The condition of the proposed method is an example of a case where each UV LED element 402 in the UV LED element 402 is driven by the method of the present example, which will be described in more detail later. More specifically, in the illustrated case, the lamp gap is set to less than or equal to 10 mm under the condition of low gap. Furthermore, the lamp gap is set to about 20 mm under the condition of high gap. In addition, under the condition of the low gap and the high gap, the illuminance of each UV LED element 402 is made the same by setting the current to supply (current per UV LED element 402) equal for all the UV LED elements 402 in the LED array 202.

When the lamp gap is small as in the case of the low gap condition, the influence of each UV LED element 402 as a point light source becomes stronger, making it difficult to obtain a uniform illuminance distribution. As a result, as shown in the figure, the illuminance changes depending on the position in the sub scanning direction. Furthermore, in this case, if the ink is cured under such conditions, color unevenness or the like may occur as the manner in which the ink cures differs depending on the position.

On the other hand, when the lamp gap is large as in the case of the high gap condition, the decrease in illuminance is assumed to increase at a portion corresponding to the end of the ultraviolet generator 104 (end of LED array 202) in the sub scanning direction, such as a portion denoted with a reference symbol A and surrounded with a broken line. In this case, curing unevenness or the like may occur in the vicinity of the boundary of the region formed by each main scan (e.g., in the vicinity of the boundary between passes), and the influence of banding may increase. In this case, banding means, for example, a phenomenon in which the boundary portion between passes becomes conspicuous.

In contrast, under the condition of the proposed method, after setting the lamp gap to 20 mm, the plurality of UV LED elements 402 are driven so that the illuminance at both ends of the LED array 202 in the sub scanning direction further increases. In this case, increasing the illuminance at the both ends of the LED array 202 means, for example, increasing the illuminance at both ends of the LED array 202 such that the decrease in illuminance, as described above, in the illuminance distribution obtained by the entire LED array 202 is suppressed. With this configuration, for example, the decrease in illuminance at the end of the ultraviolet generator 104 can be appropriately suppressed. Thus, for example, the ultraviolet-curable liquid can be uniformly and appropriately cured at the time of shaping in the shaping apparatus 10.

Figure 4A:
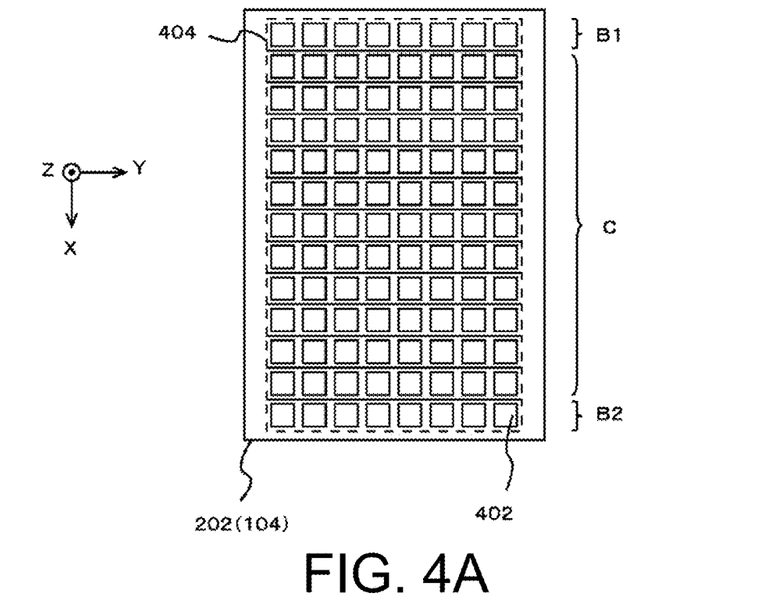
FIG. 4A shows one example of a method of driving a plurality of UV LED elements 402 in the LED array 202 under the condition of a proposed method.

Now, a manner of driving the UV LED element 402 performed by the light source driver 18 in the present example will be described in more detail. FIGS. 4A and 4B are views explaining the manner of driving a plurality of UV LED elements 402 in further detail. FIG. 4A shows one example of a method of driving a plurality of UV LED elements 402 in the LED array 202 under the condition of the proposed method described above.

As described above, in the present example, the plurality of UV LED elements 402 are driven so that the illuminance of the ultraviolet at both ends of the LED array 202 in the sub scanning direction further increases. In this case, the illuminance of the ultraviolet is, for example, the average illuminance during one main scan. More specifically, in this case, the UV LED element 402 located at the end (end in the sub scanning direction) of the LED array 202 is caused to emit light with its illuminance intentionally made to be higher than the other UV LED elements, so that the illuminance of the ultraviolet at the end portion (both ends) of the LED array 202 in the sub scanning direction is made larger than the central portion. In this case, the illuminance of the ultraviolet at the end portion in the sub scanning direction is, for example, the illuminance of the ultraviolet irradiated by the UV LED element 402 disposed at the end portion. Furthermore, the illuminance at the central portion is, for example, the illuminance of the ultraviolet irradiated by the UV LED element 402 disposed at the central portion. In addition, the illuminance of a part of the plurality of UV LED elements 402, such as the UV LED element 402 at the end portion and the UV LED element 402 at the central portion, means, for example, the illuminance of the ultraviolet irradiated by such UV LED element 402 to the position facing such UV LED element. Furthermore, the ultraviolet irradiated to a position facing the UV LED element of one part means, for example, the illuminance of the ultraviolet irradiated to a portion facing the UV LED element of one part in a plane when the plane is placed at a position separated by a preset lamp gap.

Such control can be considered as, for example, a control performed on the illuminance of each UV LED element 402 so that the illuminance of the UV LED element 402 disposed at the end portion in the sub scanning direction becomes larger than the illuminance of the UV LED element 402 disposed at the central portion in the sub scanning direction. In this case, the illuminance of the UV LED element 402 is, for example, the illuminance of the ultraviolet irradiated to a position facing the relevant UV LED element 402. Furthermore, the ultraviolet irradiated to the position facing the UV LED element 402 is, for example, the illuminance of the ultraviolet irradiated by the UV LED element 402 to a portion facing the UV LED element 402 in a plane when the plane is placed at a position separated by a preset lamp gap.

In addition, in this case, the illuminance of each UV LED element 402 is considered to be proportional to the current supplied to each UV LED element 402. Therefore, increasing the illuminance of the UV LED element 402 can be considered as, for example, increasing the current to supply to the UV LED element 402, and the like. The illuminance of each UV LED element 402 can be adjusted, for example, by changing the current supplied by the light source driver 18 to each UV LED element 402. Furthermore, the current supplied to each UV LED element 402 can be controlled by a known method such as Pulse Width Modulation (PWM) control. In this case, for example, the current can be increased by increasing the pulse width in the PWM control. Furthermore, in this case, the illuminance of the UV LED element 402 does not necessarily need to be controlled in a single unit, and the illuminance of the UV LED element may be controlled for every unit (every block) in which the plurality of UV LED elements 402 are collected.

Regarding this point, as described above, in the present example, the light source driver 18 controls the illuminance of each UV LED element 402 in units of rows 404 in which a plurality of UV LED elements 402 are arranged. Controlling the illuminance of the UV LED element 402 in units of rows 404 means, for example, controlling the sum of the currents supplied to the plurality of UV LED elements 402 included in one row 404. Furthermore, in this case, the current to be supplied to each of the plurality of UV LED elements 402 included in the same row 404 is preferably set to be the same. Moreover, in this case, for example, consideration is made to drive the plurality of UV LED elements 402 by the light source driver 18 such that the illuminance of the UV LED element 402 included in the row 404 at the end in the column direction becomes larger than the illuminance of the UV LED element 402 included in the row 404 at the central portion in the column direction.

More specifically, in the present example, among the 13 rows 404, which form a block of the controller, the row 404 in the range denoted with a reference symbol B1 in the figure and the row 404 in the range denoted with a reference symbol B2 are treated as the rows 404 at the end. Furthermore, the row 404 in the range denoted with a reference symbol C is treated as the row 404 at the central portion. In this case, the rows 404 in the ranges denoted with the reference symbols B1 and B2 can be considered as a block of a predetermined number of rows 404 located at the end of the LED array 202. Furthermore, the row 404 in the range denoted with the reference symbol C can be considered as a block or the like of the row 404 of other portions other than the end. In this case, instead of all the rows 404 in the range denoted with the reference symbol C, only the rows 404 of one part in the vicinity of the central portion in the column direction within this range may be regarded as the row 404 of the central portion. Furthermore, more specifically, in the illustrated case, there is one row 404 in the range denoted with the reference symbol B1. There is one row 404 in the range denoted with the reference symbol B2. Furthermore, there are 11 rows 404 in the range denoted with the reference symbol C. In this case, it is conceivable to make the illuminance of the UV LED elements 402 included in one row 404 at both ends of the LED array 202 larger than that of the other UV LED elements 402.

In the proposed method in the case in which the result is shown in FIG. 3, the plurality of UV LED elements 402 are driven so that the illuminance of the UV LED elements 402 included in the rows 404 at both ends becomes 1.66 times the illuminance of the other UV LED elements 402. Furthermore, the illuminance is preferably controlled similarly by the light source driver 18 even at the time of shaping in the shaping apparatus 10 (see FIGS. 1A and 1B). Furthermore, the ratio of the illuminances between the end portion and the central portion may be other than 1.66 times. In this case, for example, the plurality of UV LED elements 402 in the LED array 202 are preferably driven by the light source driver 18 so that the illuminance of the ultraviolet at the end portion in the sub scanning direction is 1.5 to 2 times the illuminance at the central portion. With such a configuration, for example, the decrease in illuminance at the end described above can be appropriately suppressed. The illuminance of the ultraviolet at the end portion in the sub scanning direction is more preferably about 1.6 to 1.8 times the illuminance at the central portion. Furthermore, as to what extent to increase the illuminance of the ultraviolet at the end portion in the sub scanning direction with respect to the illuminance at the central portion is preferably appropriately adjusted according to the specific configuration of the shaping apparatus 10 and the like. In this case, the adjustment is preferably carried out in consideration of, for example, the lamp design such as a lamp gap, the accuracy of shaping required in the shaping apparatus 10, the usage purpose of the shaped object to be shaped in the shaping apparatus 10, and the like.

According to the present example, for example, the illuminance at each position of the ultraviolet generator can be appropriately adjusted by controlling the illuminance in units of rows 404. Thus, for example, a plurality of UV LED elements 402 can be appropriately driven so that the illuminance of the ultraviolet at the end portion in the sub scanning direction becomes larger than the illuminance at the central portion with respect to the light emitting range of the LED array 202. For example, it is possible to avoid decrease in illuminance (decrease in illuminance at the end of the lamp light source) occurring at the end of the ultraviolet generator 104 and uniformly and appropriately irradiate the ultraviolet to a range in the sub scanning direction in which the nozzle row of the inkjet heads exists by controlling the illuminance.

Here, when it is considered to uniformly irradiate the ultraviolet to the range in which the nozzle row of the inkjet heads exists, a plurality of UV LED elements 402 may be merely arranged so that the light emitting range becomes sufficiently wider than the nozzle row. With this configuration, for example, the ultraviolet can be uniformly irradiated to a range of nozzle row by setting the range where decrease in illuminance occurs at the end of the ultraviolet generator 104 on the outer side of the range of the nozzle row. However, in this case, various problems may arise as the amount of ultraviolet irradiated to the outer side of the nozzle row range increases. More specifically, in this case, for example, the difference in the cumulative light quantity of the irradiated ultraviolet may increase and the difference may occur in the state after curing between the ink ejected from the nozzle at the central portion of the nozzle row and the ink ejected from the nozzle at the end. As a result, for example, the quality of the shaped object shaped in the shaping apparatus 10 may be affected. More specifically, in this case, for example, the ink at a portion where irradiation amount of the ultraviolet is large becomes an over-cured state, and the like, and it is assumed that unintended stress or the like may generate in the layer of ink as difference forms in the curing state with the other portions. Furthermore, when shaping the shaped object, as a plurality of layers of ink are formed in an overlapping manner, it is also conceivable that the influence generated in each layer overlaps and the influence generated on the entire shaped object increases.

Furthermore, when shaping is performed by the shaping apparatus 10, it is conceivable that the distance between the shaping table 14 (see FIGS. 1A and 1B) and the head portion 12 (see FIGS. 1A and 1B) increases with progress in shaping. In this case, when ultraviolet is irradiated to a wider range than the nozzle row, ultraviolet (stray light) reflected in an unintended direction is assumed to increase. Furthermore, in this case, as the reflected ultraviolets reach the nozzle row, the ink cures in the vicinity of the nozzle, which may cause ejection defects. Moreover, when widening the light emitting range of the ultraviolet, problems such as increase in cost and increase in size of the device are assumed to arise as the number of UV LED elements 402 to use increases.

On the other hand, in the present example, as described above, the ultraviolet can be uniformly irradiated to the range of nozzle rows without widening the light emitting range of the ultraviolet more than necessary. Therefore, according to the present example, for example, in the case of using the ultraviolet generator 104 including a plurality of UV LED elements 402 as a configuration for curing the ultraviolet-curable ink, the ultraviolet can be generated through a more appropriate method. Furthermore, for example, a high quality shaped object, for example, can be more appropriately shaped.

As described above, in the present example, one row 404 at each of the ends in the sub scanning direction is treated as an end row 404, and the illuminance of the UV LED element 402 included in the end row 404 is increased. However, the number of rows 404 to be treated as the end row 404 at each of the ends is not limited to one, but may be two or more. Furthermore, the configuration of the LED array 202 shown in FIG. 4A, for example, can be considered as a configuration in which the density of the UV LED element 402 is uniform or the like. In this case, as described above, the illuminance of each part of the ultraviolet generator 104 is adjusted by adjusting the current supplied to each UV LED element 402. However, in a modified example of the LED array 202 in the ultraviolet generator 104, the illuminance may be varied depending on the position in the sub scanning direction, for example, by differing the density of the UV LED element 402 depending on the position.

Figure 4B:
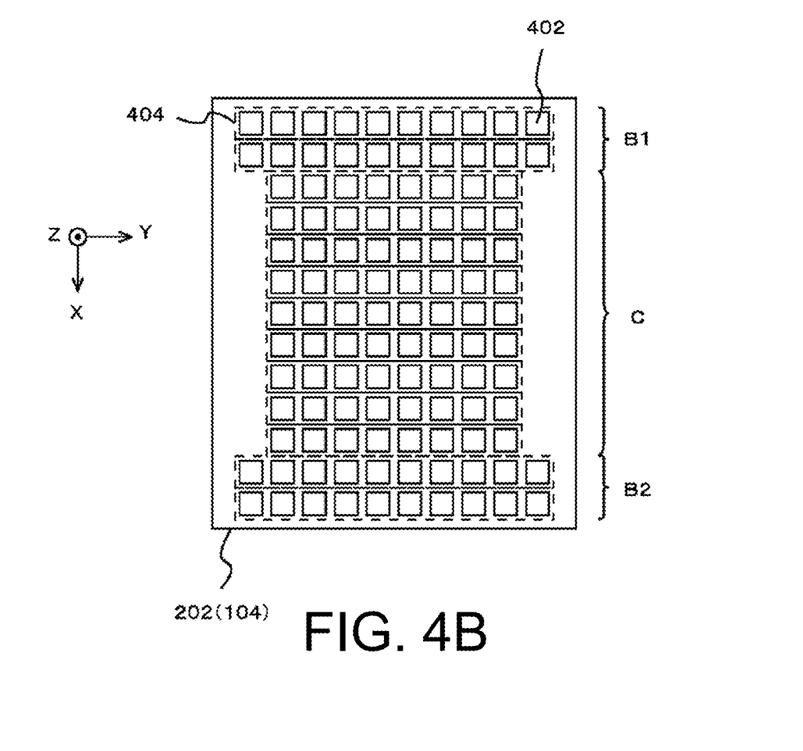
FIG. 4B is a view showing a modified example of the configuration of the LED array 202.

FIG. 4B is a view showing a modified example of the configuration of the LED array 202, and shows an example of the configuration of the LED array 202 in the case where the density of the UV LED element 402 is varied depending on the position. In the LED array 202 of the present modified example, the plurality of UV LED elements 402 are arranged so that the LED density at the end portion in the sub scanning direction is larger than the density at the central portion. In this case, the LED density is the number of UV LED elements 402 per unit length in the sub scanning direction.

More specifically, in the present modified example, the number of UV LED elements 402 included in the row 404 at the end in the sub scanning direction is set to be larger than the number of UV LED elements 402 included in the row 404 at the central portion. In this case, the row 404 at the end in the sub scanning direction is the row 404 in the range denoted with the reference symbol B1 and the row 404 in the range denoted with the reference symbol B2. Furthermore, the row 404 at the central portion is the row 404 in the range denoted with the reference symbol C. In the present modified example, the number of rows 404 treated as the end row 404 at each end is two, as shown in the figure. Furthermore, in the present modified example, the current supplied to each UV LED element 402 is not made different for each element but is set to a preset constant current. Moreover, the current of the same magnitude is supplied to all the UV LED elements 402 in all the rows 404. In such a configuration, the illuminance at each position of the LED array 202 varies according to the number of UV LED elements 402 included in the row 404 at each position. Therefore, in the present modified example as well, the illuminance at each position of the ultraviolet generator 104 can be appropriately adjusted.

Furthermore, in a further modified example of the configuration of the LED array 202, the illuminance may be adjusted by a method other than the above. For example, in the manner of changing the LED density, consideration is also made to changing the interval of the rows 404 in the sub scanning direction (interval of the UV LED elements 402 in the column direction in the LED array 202) instead of changing the number of UV LED elements 402 included in one row 404. Furthermore, for example, when using the LED array 202 having the configuration shown in FIG. 4A, consideration is also made to use UV LED elements having different irradiation characteristics from other UV LED elements 402 as the UV LED elements 402 of one part. In this case, "different irradiation characteristics" means that, for example, the illuminance differs when the same current is supplied. In this case, consideration is made to using the UV LED element 402 having different irradiation characteristics from the row 404 at the central portion (row 404 in a range denoted with reference symbol C) as the UV LED elements 402 included in the rows 404 (row 404 in a range denoted with reference symbols B1, B2) at the end in the sub scanning direction. In such a configuration as well, the illuminance at each position of the ultraviolet generator 104 can be appropriately adjusted.

Furthermore, consideration is made to adjusting the illuminance distribution obtained by the entire LED array 202 using, for example, optical components such as a lens (optical lens) or the like. In this case as well, the illuminance at each position of the ultraviolet generator 104 can be adjusted appropriately by performing adjustment so that the illuminance of the ultraviolet at the end portion in the sub scanning direction is larger than the illuminance at the central portion in the light emitting range of the LED array 202. Furthermore, in this case as well, the excessive increase in size of the ultraviolet generator 104 and the increase in cost can be appropriately suppressed by using optical components in combination with a configuration in which a plurality of UV LED elements 402 are arranged in the sub scanning direction. In this case, for example, if the illuminance distribution having properties same as (similar to) the luminance distribution of the ultraviolet shown as the proposed method is obtained only by adjustment using a lens or the like, a plurality of UV LED elements 402 can be driven without adjusting the illuminance in units of individual UV LED elements 402 or rows 404.

Next, the operation of shaping carried out in the present example will be described in more detail. As described above, in the present example, the shaping apparatus 10 (see FIGS. 1A and 1B) shapes a three-dimensional shaped object by the layered shaping method. In this case, it is conceivable to form each layer of ink forming the shaped object in a multi-pass method in which, for example, the plurality of main scans are performed on the same position.

Figure 5A:
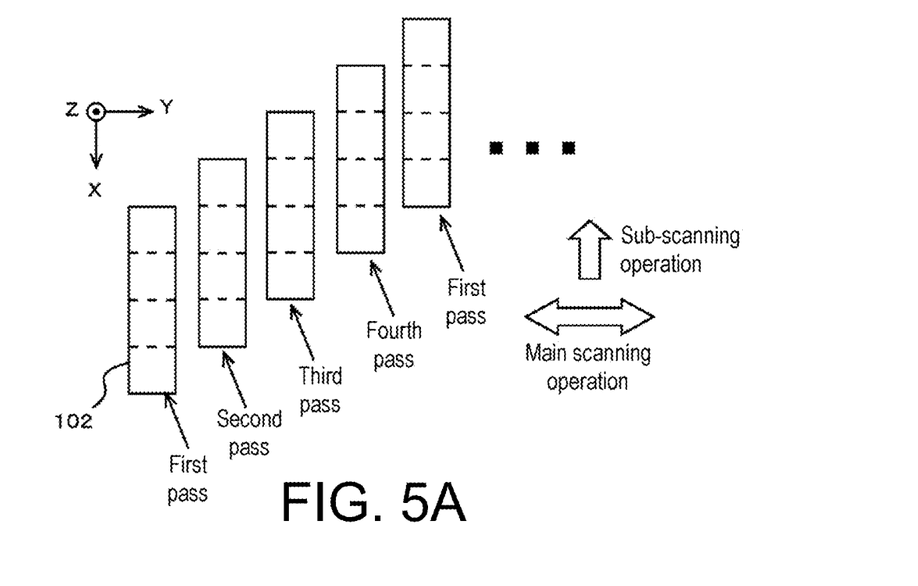
FIG. 5A shows one example of an operation of the multi-pass method.
Figure 5B:
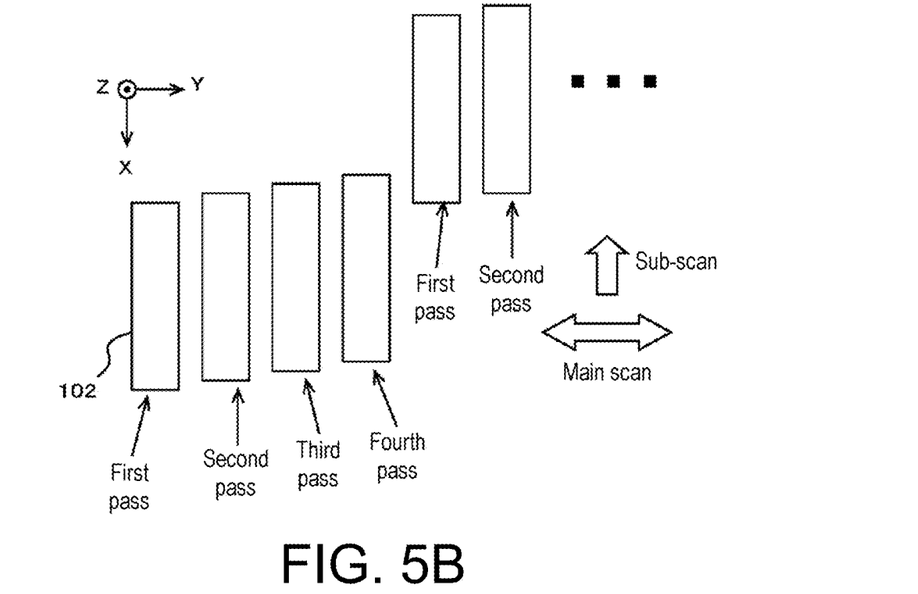
FIG. 5B shows one example of an operation of the multi-pass method in a small pitch method.

FIGS. 5A and 5B are views explaining the operation of the multi-pass method performed when forming the layer of ink, and shows one example of a position of the inkjet head 102 in the sub scanning direction at the time of each main scan for a case in which the pass number in the multi-pass method is four (case of operation of 4 passes). FIG. 5A shows one example of an operation of the multi-pass method.

In a case where a layer of ink is formed by the multi-pass method at the time of shaping a shaped object, for example, consideration is made to performing an operation same as or similar to the operation of the multi-pass method for a case in which an image is printed with an inkjet printer as the operation for forming one layer of ink. More specifically, in this case, for example, with respect to the feed amount in one sub scan, the nozzle length Ln is set to a distance Ln/4 obtained by dividing the nozzle length Ln by the pass number 4, and the sub scan is performed between each main scan. In such a configuration, as shown in the figure, the sub scan is performed at a constant feed amount every time the main scan is performed, and the main scanning direction and the sub scanning direction are performed so that a total feed amount in the sub scan corresponding to the pass number becomes equal to the nozzle length Ln. With this configuration, for example, the layer of ink can be appropriately formed with the multi-pass method.

Furthermore, at the time of shaping a shaped object, it is also conceivable to perform the operation of the multi-pass method in a small pitch method different from the above. FIG. 5B shows one example of an operation of the multi-pass method in a small pitch method. The operation in the small pitch method is, for example, an operation of performing a main scan for the pass number with the sub scan in between in a state in which the feed amount in the sub scan is set small, and performing a sub scan with a larger feed amount every time the main scan for the pass number is performed. In this case, as shown in the figure, in the sub scan (sub scan with a small pitch) performed between the main scans for the pass number (first pass to fourth pass), the sub scan is performed with a feed amount smaller than Ln/4 which is the feed amount in the case described using FIG. 5A. Furthermore, in the sub scan (sub scan with a large pitch) performed after the last main scan (fourth pass) corresponding to the pass number, the sub scan is performed with a feed amount larger than Ln/4. Thus, the total feed amount in the sub scan corresponding to the pass number is set to be equal to the nozzle length Ln, as in the case described using FIG. 5A. Even in such a configuration as well, for example, a layer of ink in the multi-pass method can be appropriately formed.

In a case in which a layer of ink is formed by the multi-pass method in the small pitch pass method, the shaping can be performed more efficiently if the shape of the shaped object satisfies the predetermined condition. However, in this case, since the main scan is performed a plurality of times without barely changing the position in the sub scanning direction, the influence of the manner of irradiating the ultraviolet to the vicinity of the end of the ultraviolet generator 104 (see FIGS. 1A and 1B) may easily occur. More specifically, for example, in a case in which the light emitting range of the ultraviolet by the ultraviolet generator 104 is not matched with the nozzle length Ln or in a case in which decrease in illuminance is occurring at a portion corresponding to the end of the ultraviolet generator 104 as, for example, in the case where a UV LED element is provided up to a position that does not overlap with the range of nozzle row in the sub scanning direction at all, the main scan is performed for a plurality of times with the position of the inkjet head 102 in the sub scanning direction substantially the same, so that such influences are superimposed and a larger problem tends to occur. On the other hand, when the proposed method described above is used, a uniform ultraviolet can be irradiated to the range corresponding to the nozzle row, so that even in a case in which the operation of the small pitch method is performed, the occurrence of such problem can be appropriately prevented.

Regarding the small-pitch method, more specifically, in the sub scan with a small pitch performed between the main scans corresponding to the pass number, it is conceivable to determine the feed amount (feed amount of the small pitch), for example, with a method dependent on the interval of the nozzles in the nozzle row (nozzle pitch). In this case, it is conceivable to make the feed amount of the small pitch less than or equal to 20 times the nozzle pitch or the like. Furthermore, it is conceivable to make the feed amount of the small pitch, for example, an integral multiples of the interval of the nozzles (nozzle pitch) in the nozzle row. In this case, it is conceivable to make the feed amount of the small pitch to larger than or equal to the nozzle pitch (one time of the nozzle pitch). More specifically, it is conceivable to have the feed amount of the small pitch, for example, to about 1 to 20 times the nozzle pitch, preferably about 1 to 5 times the nozzle pitch. It is also conceivable to make the feed amount of the small pitch, for example, to a distance less than the nozzle pitch. Furthermore, it can be considered preferable to set the feed amount of the small pitch to, for example, less than or equal to 10 times (e.g., about 0.25 to 10 times) the nozzle pitch. Moreover, the feed amount of the small pitch is preferably sufficiently smaller than the nozzle length Ln. Therefore, it is conceivable to set the feed amount of the small pitch to, for example, less than or equal to about ⅓₀ of the nozzle length Ln. Furthermore, the feed amount of the small pitch may be less than or equal to about ⅕₀ of the nozzle length Ln. Moreover, the feed amount of the small pitch can be considered as, for example, a distance smaller than the distance obtained by dividing the nozzle length Ln by the pass number or the like. In addition, the sub scan with feed amount of a small pitch is not necessarily performed between all of the main scans corresponding to the pass number, and may be performed only between some main scans. Therefore, the operation in the small pitch method can also be considered as, for example, an operation of setting the feed amount to a small pitch or the like in the sub scan performed between at least some of the main scans among the plurality of main scans performed while forming one layer. Furthermore, the feed amount of the large pitch, for example, can be set to the distance that matches the nozzle length Ln. In this case, the distance matching the nozzle length Ln is, for example, a distance that becomes equal to the nozzle length Ln by adding the sum of the feed amounts in the sub scans of the small pitch performed between the main scans corresponding to the pass number.

Subsequently, supplementary explanation and the like concerning the configuration explained above are carried out. In the following description, for the sake of convenience of explanation, each configuration described above is collectively referred to as the present example. As also described above, in the present example, the light emitting length La of the LED array 202 (see FIGS. 2A and 2B) in the ultraviolet generator 104 is formed to be equal to the nozzle length Ln of the inkjet head 102 (see FIGS. 1A and 1B). Regarding this point, in the head portion 12 (see FIGS. 1A and 1B) including the inkjet head 102 and the ultraviolet generator 104, the arrangement of the inkjet head 102 and the ultraviolet generator 104 is not limited to the specific configuration described above, and various modifications can be made. In this case, instead of arranging the inkjet heads with the positions in the sub scanning direction of all the inkjet heads 102 aligned, some inkjet heads 102 may be arranged so that the positions in the sub scanning direction are not overlapped with the other inkjet heads 102. In this case, considering a group of a plurality of inkjet heads 102 having the positions in the sub scanning direction aligned as a row of the inkjet heads 102, the ultraviolet generator 104 is preferably arranged for each row. Furthermore, in this case, the light emitting range La may be matched with the range of the nozzle row in the sub scanning direction between the nozzle array in the inkjet head 102 included in one row and the ultraviolet generator 104 corresponding to that row.

Furthermore, the light emitting range of the ultraviolet by the ultraviolet generator 104, for example, can be considered as a light emitting range or the like on a shaped object, which is an object to which the ultraviolet-curable ink is ejected at the time of operation of the shaping apparatus 10. In this case, at the time of the operation of the shaping apparatus 10, the ultraviolet is irradiated to an irradiated range corresponding to the light emitting range of the ultraviolet by the ultraviolet generator 104 in the shaped object. In practice, the width of the irradiated range in the sub scanning direction can be considered to be substantially the same as the width of the light emitting range of the ultraviolet by the ultraviolet generator 104 in the sub scanning direction. Therefore, a plurality of UV LED elements in the ultraviolet generator 104, for example, can be considered to be arranged so that the irradiated range overlaps the range of the nozzle row in the sub scanning direction. Moreover, in this case, it is conceivable that the operation of the light source driver 18, for example, drives a plurality of UV LED elements as described above to equalize the light quantity of the ultraviolet irradiated to the irradiated range overlapping with the range of the nozzle row.

Furthermore, as described above, the shaping apparatus 10 of the present example is an example of a liquid ejection device. An example of the liquid ejection device is not limited to the shaping apparatus 10, and other configurations can also be considered. Furthermore, more specifically, as another example of the liquid ejection device, for example, an inkjet printer or the like can be considered. In this case, for example, the inkjet printer includes a head portion including an inkjet head and an ultraviolet generator similarly to the configuration described above, and a two-dimensional image is printed by ejecting the ultraviolet-curable ink from the inkjet head. In this case, a medium to be printed in the inkjet printer can be considered as an object to which ultraviolet-curable ink is ejected. In this case as well, the ultraviolet generator and the inkjet head are arranged with the positions in the sub scanning direction aligned. Furthermore, an ultraviolet generator including an LED array configured so that the light emitting length La is equal to the nozzle length Ln of the inkjet head is used. The ultraviolet irradiated by the ultraviolet generator is set so that the illuminance of the ultraviolet at the end portion in the sub scanning direction becomes larger than the illuminance at the central portion. Even in such a configuration, uniform ultraviolet can be more appropriately irradiated to a necessary region. Furthermore, for example, in the case of using an ultraviolet generator including a plurality of UV LED elements, the ultraviolet can be generated by a more appropriate method.

INDUSTRIAL APPLICABILITY

The present disclosure can be suitably used in, for example, a liquid ejection device.

What is claimed is:

1. A liquid ejection device that ejects an ultraviolet-curable liquid, which is a liquid that cures according to an ultraviolet, the liquid ejection device comprising:
   an ejection head that ejects the ultraviolet-curable liquid from a nozzle row in which a plurality of nozzles are arranged,
   a scanning driver that causes the ejection head to perform a main scan of ejecting the liquid while moving in a main scanning direction which is preset;
   an ultraviolet generator that generates the ultraviolet; and
   a light source driver that causes the ultraviolet generator to generate the ultraviolet;
   wherein
   when the ejection head performs the main scan,
   the ultraviolet generator irradiates the ultraviolet while moving in the main scanning direction together with the ejection head;
   the plurality of nozzles in the nozzle row are arranged so that positions in a sub scanning direction, which is a direction orthogonal to the main scanning direction, are different from each other;
   the ultraviolet generator includes a plurality of UV LED elements which are LED elements for generating the ultraviolet;
   wherein the liquid ejection device is a shaping apparatus that is configured to shape a shaped object which is three-dimensional;
   the ejection head is configured to eject the ultraviolet-curable liquid to be used for shaping of the shaped object;
   the plurality of UV LED elements in the ultraviolet generator are arranged such that a light emitting range of the ultraviolet by the ultraviolet generator overlaps a range of the nozzle row in the sub scanning direction;
   an illuminance of each UV LED element is adjusted by changing a supplied current;
   the light source driver controls the supplied current of the plurality of UV LED elements by a pulse width modulation control; and
   in the pulse width modulation control, in a range in which the ultraviolet-curable ink is ejected on the shaped object, the light source driver controls a pulse width of the plurality of UV LED elements at an end portion in the sub scanning direction to be larger than a pulse width of the plurality of UV LED elements at a central portion, and the plurality of UV LED elements are driven such that an illuminance of the ultraviolet at the end portion in the sub scanning direction is larger than an illuminance at the central portion.

2. The liquid ejection device according to claim 1, wherein
   the light source driver drives the plurality of UV LED elements such that the illuminance of the ultraviolet at the end portion in the sub scanning direction is 1.5 to 2 times the illuminance at the central portion.

3. The liquid ejection device according to claim 1, wherein
   the scanning driver further causes the ejection head to perform a sub scan of moving in the sub scanning direction relative to the shaped object being shaped;
   the liquid ejection device forms the shaped object by forming a plurality of layers formed of the ultraviolet-curable liquid in an overlapping manner, and forms each of the layers with a multi-pass method of performing the main scan plural times to the same position; and
   as the sub scan to be performed between at least a part of the main scans among a plurality of the main scans performed while forming one layer, the scanning driver causes the ejection head to perform the sub scan of having a movement amount in the sub scanning direction to less than or equal to 1/30 of a length of the nozzle row in the sub scanning direction.

4. The liquid ejection device according to claim 1, wherein
   a position in the sub scanning direction of the nozzle on one-end side of the nozzle row is as a one-end side nozzle position,
   a position in the sub scanning direction of the nozzle on the other-end side of the nozzle row is as an other-end side nozzle position,
   an UV LED element at an extreme end on one side in the sub scanning direction of the plurality of UV LED elements in the ultraviolet generator is as a one-side LED, and
   an UV LED element at an extreme end on the other end in the sub scanning direction is as an other-side LED, wherein the one-end side nozzle position is the same position as the position in the sub scanning direction of any portion of the one-side LED, and the other-end side nozzle position is the same position as the position in the sub scanning direction of any portion of the other-side LED.

5. The liquid ejection device according to claim 4, wherein
a position of a light emitting center of the one-side LED in the sub scanning direction is aligned with the one-end side nozzle position; and
a position of a light emitting center of the other-side LED in the sub scanning direction is aligned with the other-end side nozzle position.

6. The liquid ejection device according to claim 1, wherein
in the ultraviolet generator, the plurality of UV LED elements are arranged in an array form in a column direction parallel to the sub scanning direction and a row direction parallel to the main scanning direction; and
the plurality of UV LED elements arranged in the row direction with the positions aligned in the column direction are defined as a row of the UV LED elements,
the light source driver drives the plurality of UV LED elements such that an illuminance of the UV LED element included in the row at an end in the column direction is larger than an illuminance of the UV LED element included in the row at a central portion in the column direction.

7. The liquid ejection device according to claim 1, wherein
when number of UV LED elements per unit length in the sub scanning direction is defined as an LED density,
the plurality of UV LED elements are arranged such that the LED density at an end portion in the sub scanning direction is larger than the density at the central portion in the ultraviolet generator.

8. A liquid ejection method for ejecting an ultraviolet-curable liquid, which is a liquid that cures according to an ultraviolet, the liquid ejection method comprising:
causing an ejection head, that ejects the ultraviolet-curable liquid from a nozzle row in which a plurality of nozzles are arranged, to perform a main scan of ejecting the liquid while moving in a main scanning direction which is preset;
causing an ultraviolet generator to generate the ultraviolet; and
causing the ultraviolet generator to irradiate the ultraviolet while moving in the main scanning direction together with the ejection head, when causing the ejection head to perform the main scan;
wherein
the plurality of nozzles in the nozzle row are arranged so that positions in a sub scanning direction, which is a direction orthogonal to the main scanning direction, are different from each other;
the ultraviolet generator includes a plurality of UV LED elements which are LED elements for generating the ultraviolet;
wherein the liquid ejection method is a shaping method that shapes a shaped object which is three-dimensional;
the ejection head is configured to eject the ultraviolet-curable liquid to be used for shaping of the shaped object;
the plurality of UV LED elements in the ultraviolet generator are arranged such that a light emitting range of the ultraviolet by the ultraviolet generator overlaps a range of the nozzle row in the sub scanning direction;
an illuminance of each UV LED element is adjusted by changing a supplied current;
the supplied current of the plurality of UV LED elements is controlled by a pulse width modulation control; and
in the pulse width modulation control, in a range in which the ultraviolet-curable ink is ejected on the shaped object, a pulse width of the plurality of UV LED elements at an end portion in the sub scanning direction is controlled to be larger than a pulse width of the plurality of UV LED elements at a central portion, and the plurality of UV LED elements are driven such that an illuminance of the ultraviolet at the end portion in the sub scanning direction is larger than an illuminance at the central portion.

* * * * *